UNITED STATES PATENT OFFICE.

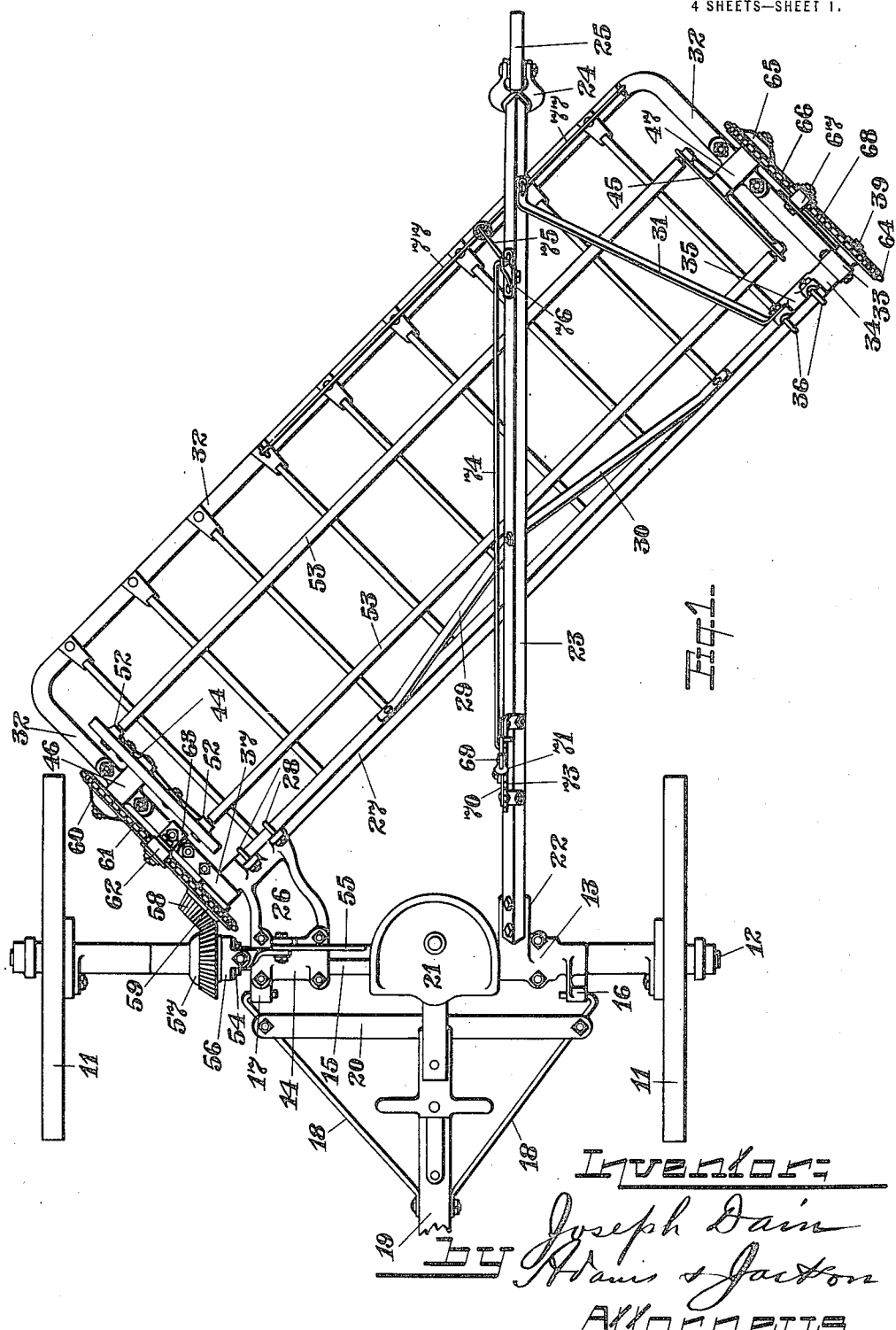

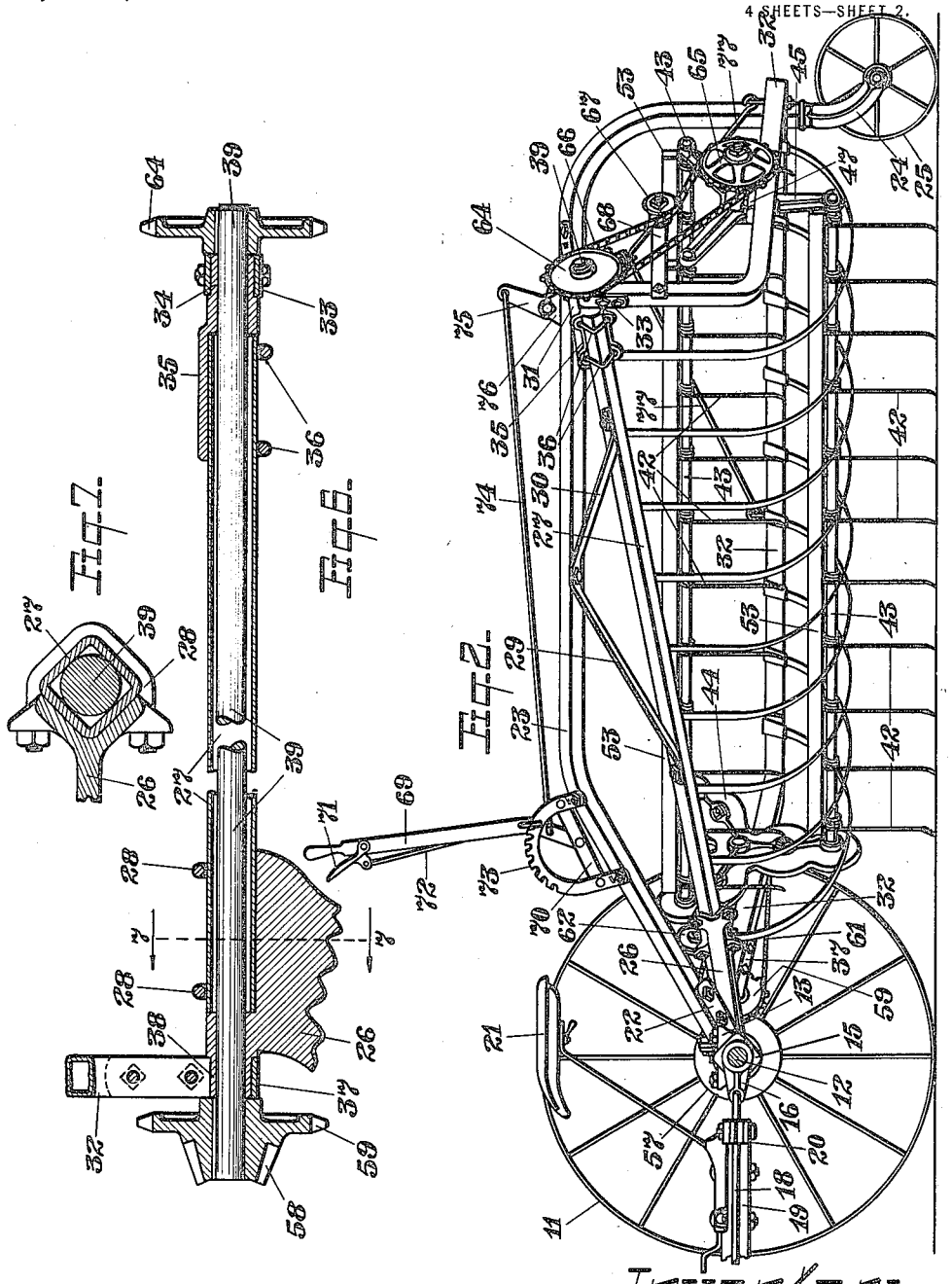

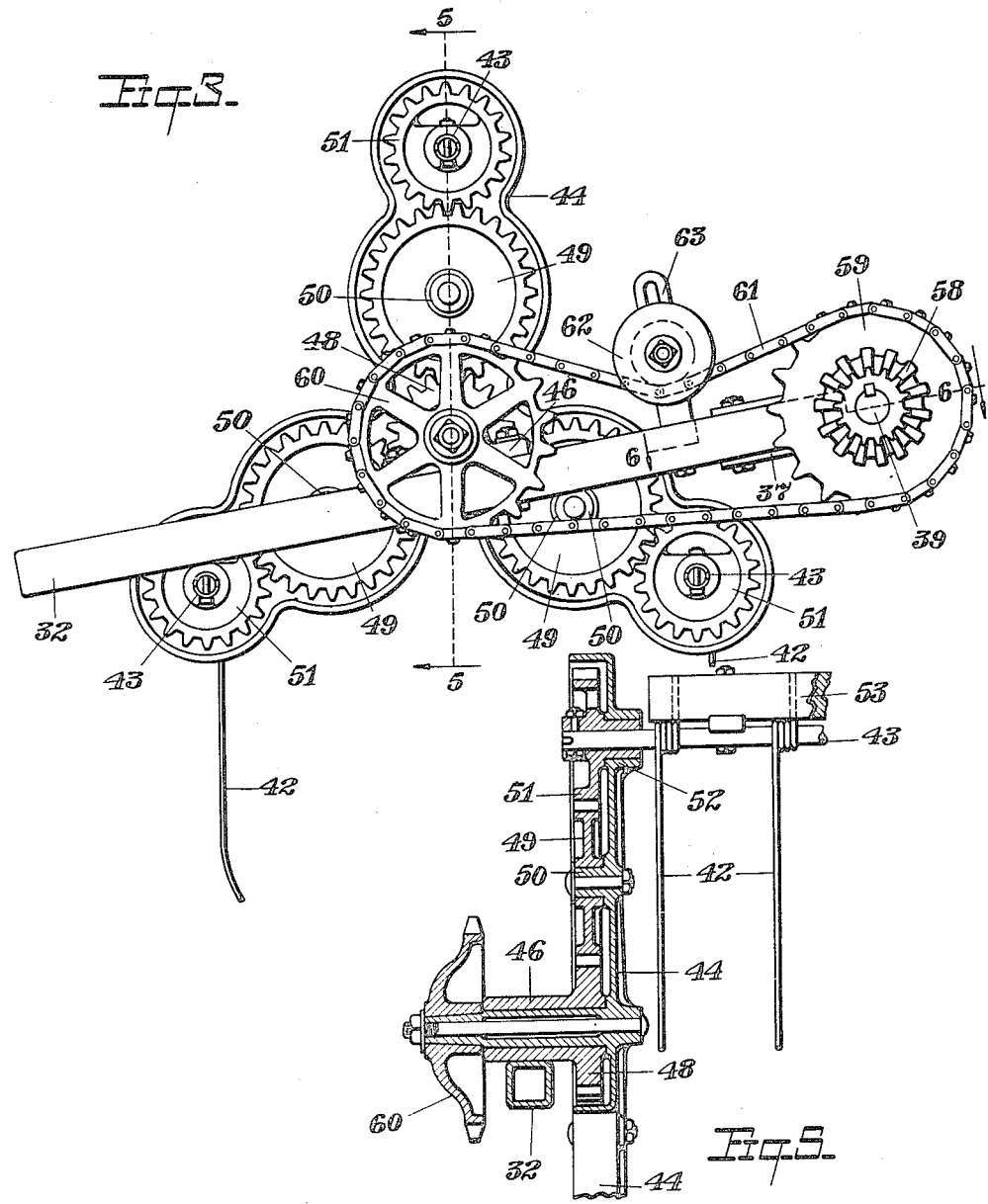

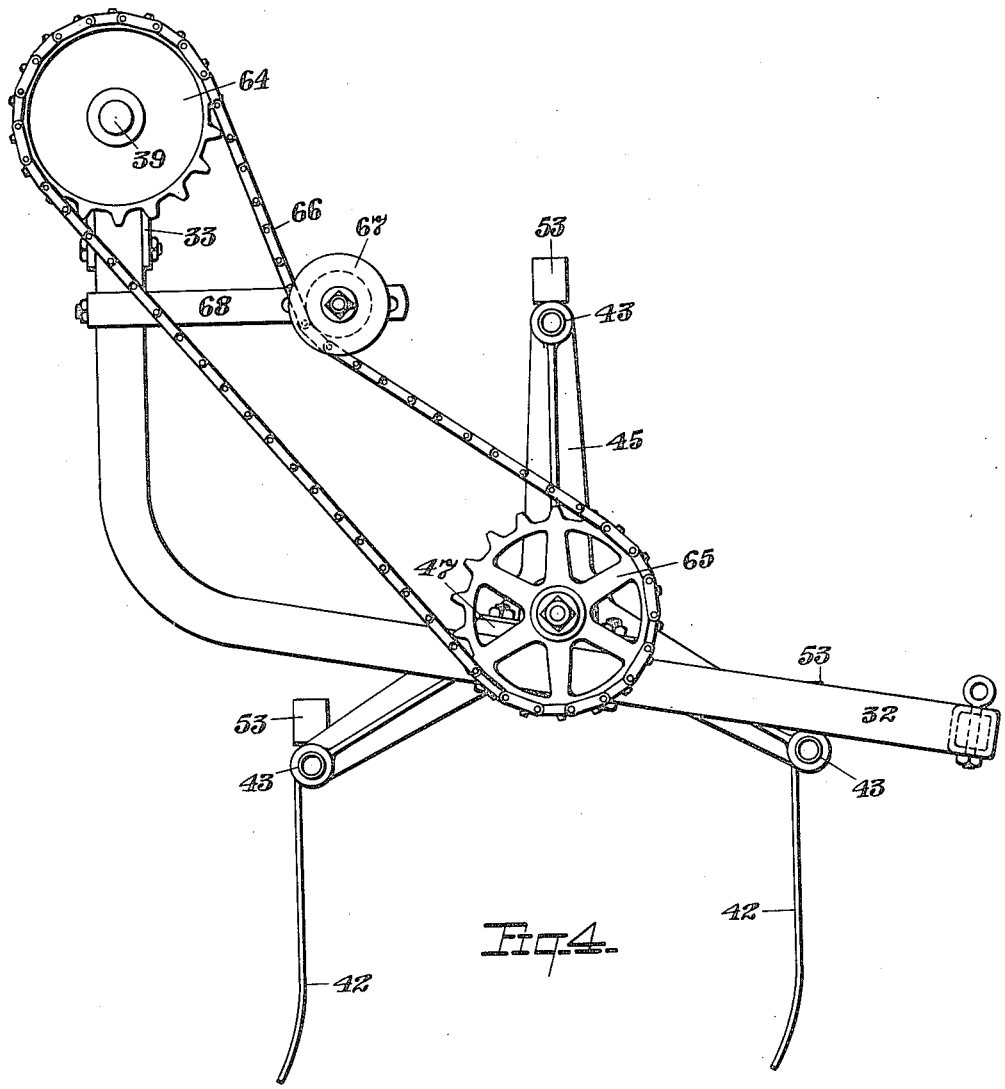

JOSEPH DAIN, OF MOLINE, ILLINOIS, ASSIGNOR TO DAIN MANUFACTURING COMPANY OF IOWA, OF OTTUMWA, IOWA, A CORPORATION OF IOWA.

SIDE-DELIVERY HAY-RAKE.

1,283,474.

Specification of Letters Patent.    Patented Nov. 5, 1918.

Application filed November 4, 1915. Serial No. 59,600.

*To all whom it may concern:*

Be it known that I, JOSEPH DAIN, a citizen of the United States, residing at Moline, in the county of Rock Island, State of Illinois, have invented certain new and useful Improvements in Side-Delivery Hay-Rakes, of which the following is a specification, reference being had to the accompanying drawings.

My invention relates to side delivery rakes of the type having a revolving raking reel mounted at an angle relative to the forward movement of the machine. It is one of the principal objects of my invention to provide new and improved means for readily and quickly adjusting the reel vertically relative to the supporting frame. In some fields or portions of fields, owing to the condition of the ground or of the product to be raked, it is often desirable to have the teeth operate close to the ground, while in other fields or in other portions of the same field conditions may be such that it is desirable to adjust the reel and its raking teeth for operation at a higher elevation. It is another object of my invention to provide means for adjusting both ends of the reel simultaneously and evenly whereby all of the teeth are simultaneously adjusted up or down relative to the ground. It is another object of my invention to provide for raising the reel bodily from the ground so as to pass obstructions and so as to be capable of being transported over the ground without any raking effect as desired. By providing for the elevation of the reel clear of the ground, I am enabled to rake certain selected portions of a field without dragging into bunches or otherwise disturbing a mown crop lying on the remaining portions. It is another object to provide new and improved means for effecting an adjustment of the reel by the operator from the seat while the machine is in motion. It is another object of my invention to provide a new and improved construction and arrangement of parts by virtue of which the vertical adjustment of the reel bodily relative to the frame of the machine does not affect the reel driving means, whereby the reel may be rotated by the forward movement of the machine in whatever position the reel may stand vertically. It is still another object of my invention to provide for driving both ends of the reel in unison, whereby it is rendered unnecessary to use a central longitudinally-extending shaft through the reel from end to end, enabling me thus to employ rake teeth of a length which would not otherwise clear. I am thus enabled to employ teeth of greater effective resiliency, increasing thus the efficiency of the tooth and also increasing its durability. It is another object of my invention to improve devices of this type in sundry details hereinafter pointed out. The preferred means by which I have accomplished my several objects are illustrated in the accompanying drawings and are hereinafter specifically described. That which I believe to be new and desire to cover by this application is set forth in the claims.

In the drawings:—

Figure 1 is a plan view of my improved rake;

Fig. 2 is a side elevation thereof, with one of the supporting wheels removed for the sake of clearness of illustration;

Fig. 3 is an elevation of the front end of the reel showing a portion of the driving means therefor;

Fig. 4 is an elevation of the rear end of the reel, showing the driving means therefor;

Fig. 5 is a sectional view through the front end of the reel, taken substantially on line 5—5 of Fig. 3;

Fig. 6 is a detailed longitudinal sectional view taken substantially on line 6—6 of Fig. 3, showing portions of the reel driving shaft, and showing the ends of the arms of the U-shaped reel frame pivotally mounted upon the axis of said shaft; and Fig. 7 is a cross-section taken on line 7—7 of Fig. 6.

Referring to the several figures of the drawings in which corresponding parts are indicated by the same reference characters,—

11 indicates traction drive wheels that support an axle 12 to which said wheels are connected by any suitable mechanism for rotating the shaft upon the forward movement of the machine. Journaled upon the axle 12 intermediate of the wheels 11 is a draft and supporting frame comprising bracket bearings 13—14 connected by a member 15. The bearing brackets 13—14 are provided with lugs 16—17, respectively, which receive diagonal draft members 18 of a tongue 19 to which the motive power for the machine is adapted to be hitched. The rear end of the tongue 19 is connected to a cross-bar 20 which in turn is connected at its ends to the diagonally-extending draft members 18. A seat 21 is mounted in any suitable manner upon the tongue 19 and the bar 20.

The bearing bracket 13 is provided with a lug or extension 22 to which is securely attached the forward end of a rearwardly-extending arched frame member 23, preferably formed of square pipe. The rear downwardly-projecting end of the arched frame member 23 is fitted with a swiveled shank 24 in which is mounted a supporting caster wheel 25.

The main frame of the machine comprises further an arm 26 projecting back from the bearing bracket 14, having a frame bar 27 securely clamped thereto by clips 28, the bar 27 as shown being hollow and square in cross-section. The bar 27, as shown in Fig. 1, extends rearwardly at an angle to the axle 12, and, as shown in Fig. 2, is inclined upwardly in order that sufficient clearance will be provided at its rear end for the windrow formed by the raking reel. Braces 29, 30 and 31 are employed for holding the bar 27 firmly in position relative to the arched frame bar 23, the bars 23 and 27 being thus rendered suitable for holding the raking reel in adjusted operative position or for supporting it in raised position out of contact with the ground, as hereinafter described.

The means for mounting the reel upon the framework, as above described, comprises a U-shaped reel frame 32 hinged upon the frame-bar 27, the reel being journaled, as hereinafter described, in the said frame 32. The rear arm of the frame 32 is connected to the rear end of the bar 27 by means of a clip 33 carried by the said arm journaled upon the bearing sleeve 34 carried by a casting 35 secured in position upon the said bar 27 by suitable clips 36. The forward end of the frame 32 is connected to the forward end of the bar 27 by means of a clip 37 journaled upon a bearing sleeve 38 formed integrally with the arm 26 in alinement with the bearing sleeve 34. Thus the frame 32 with the reel mounted thereon is adapted to swing up and down relative to the framework of the machine upon the bearing sleeves 26 and 34.

The raking reel comprises three series of flexible teeth 42 mounted upon shafts 43 which are carried by a front head 44 and a rear head 45 revolubly mounted on the reel frame 32 on the same axis, being supported by alined bearings 46 and 47, respectively. The three series of teeth 42 are held in raking position by trains of gears carried by the front head 44. These gear trains comprise a stationary central gear 48 secured to the bearing 46 and preferably formed integrally therewith, intermediate gears 49 journaled upon suitable bearings 50 carried by the reel head 44, the outer gears 51 secured to the shafts 43, the hubs of the gears 51 being supported in bearings 52 formed in the reel head, the shafts 43 being thus held against turning while being revolved about the horizontal axis of the reel. As is best shown in Fig. 5, the teeth 42 are held in normal vertical position depending from the shafts 43 as said shafts revolve by means of bars 53 fixed upon the shafts in spaced relation thereto, the ends of the teeth 42 being embedded in the bars 53.

The power for operating the reel is derived from the main wheels 11, being taken from the axle 12 and transmitted to the reel by means of a suitable clutch. One member 54 of the clutch as illustrated is secured to the axle 12 to turn therewith, but has longitudinal movement relative thereto, being adapted to be moved into and out of operative position by a lever 55 (see Fig. 1) and shifter-fork 56 for engagement as desired with a mating clutch member carried by a bevel gear 57 journaled upon the axle 12. Meshing with the bevel gear 57 is a bevel pinion 58 secured to a drive shaft 39 journaled in the sleeves 26—34, the shaft 39 being thus adapted to be driven in counterclockwise direction in Fig. 3 upon the forward movement of the machine with the clutch member 54 in operative position.

Means is provided for driving the forward end of the reel from the shaft 39, comprising a sprocket 59 secured upon the shaft 39, being perferably formed integrally with the bevel pinion 58, said sprocket being connected through the medium of a link belt 61 with a sprocket 60 secured to the reel head 44. A flanged roller 62 is adjustable upon a slotted bracket 63 secured to the frame 32 for regulating the tension of the link belt 61.

Means is also provided for driving the rear end of the reel from the shaft 39, comprising a sprocket 64 keyed upon the shaft 39, being connected by a link belt 66 with a sprocket 65 secured to the reel head 45. The tension of the link belt 66 is regulated by a flanged roller 67 that can be adjusted in a slotted bracket 68 secured to the frame 32.

By reason of driving both ends of the reel from the shaft 39, making unnecessary the use of any connection directly between the reel heads 44—45 on the axis of their rotation, I am enabled to use longer teeth 42 than could otherwise be employed, thus increasing the resiliency capable of being attained effectively, and correspondingly increasing the life of the teeth.

All of the teeth 42 along the full length of the reel can be raised or lowered by swinging the frame 32 about the bearing sleeves 26—34, and such an adjustment of the frame 32 and the reel will not affect the reel driving mechanism, inasmuch as the bearings 26—34 are concentric with the axis of the drive shaft 39.

The means provided for swinging the reel frame 32 about the bearings 26—34 comprises a lever 69 mounted upon a bracket 70 secured to the forward portion of the arched frame member 23, the lever being within convenient reach of an operator upon the seat 21. The lever 69 is provided with a hand latch 71 and plunger 72 of the ordinary type adapted to coöperate with a rack 73 mounted upon the bar 23 for locking the lever 69 in the desired adjusted position. A connecting rod 74 extends between the lever 69 and one arm of a bell crank lever 75 pivotally supported on a bracket 76 secured to the rear portion of the arched frame bar 23, the other arm of the bell-crank lever 75 being connected with the reel frame 32 by diverging links 77. The lower end of one of the links 77 is connected with the reel frame 32 near its central point, while the lower end of the other link 77 is connected with the reel frame near the rear end thereof. The links 77, in connection with the bracket 26 and the bracket 35, are adapted to support the reel frame 32 evenly so as to hold the reel in the desired adjusted positions. Whenever it is desired, the operator can, by a forward stroke of the lever 69, raise the reel relative to the frame bar 23, obtaining the desired pressure of the reel upon the ground, and obtaining the desired contact of the teeth 42 with the ground. By a still further movement of the lever 69, the operator can raise the reel entirely out of contact with the ground, ready either for transportation from one field to another or ready for a quick return to operative position as may be desired. As will be readily understood, in case the reel is raised clear of the ground for transportation from one field to another, the clutch member 54 will be preferably thrown out of operative position, but when the reel is raised clear of the ground for a very short time it is unnecessary to stop the rotation of the reel. Upon a stroke of the lever 69 for raising the reel, the ends of the reel are moved simultaneously and substantially evenly, whereby the desired results are attained.

What I claim as my invention and desire to secure by Letters Patent, is—

1. In a side delivery rotary rake, the combination of a supporting frame, a diagonally-disposed raking reel revolubly mounted thereon, means operable during the operation of the rake for raising said reel vertically relative to said supporting frame about an axis diagonally disposed to the line of draft.

2. In a side delivery rotary rake, the combination of a supporting frame, a diagonally-disposed raking reel revolubly mounted thereon, means for driving said reel, and means comprising a lever within reach of the operator adapted to be operated during the raking operation for raising said reel vertically relative to said supporting frame about an axis diagonally disposed to the line of draft.

3. In a side-delivery rotary rake, the combination of a supporting frame, a diagonally-disposed raking reel revolubly mounted thereon, means for driving said reel serving to pile the hay into a windrow at one side, and means within reach of the driver and operable during the operation of the rake for raising said reel relative to said supporting frame about an axis diagonally disposed to the line of draft without affecting the operation of said driving means.

4. In a side delivery rotary rake, the combination of a supporting frame, a reel frame pivotally mounted on a diagonally-extending axis on said supporting frame, a raking reel revolubly mounted on said reel frame, driving means revoluble about an axis coincident with the axis upon which said reel frame is pivotally mounted, means for operatively connecting said driving means with said reel for rotating the reel, and means for swinging said reel frame vertically relative to said supporting frame for raising and lowering the reel without affecting the operation of the driving means.

5. In a side delivery rotary rake, the combination of a supporting frame, a reel frame pivotally mounted on a diagonally-extending axis on said supporting frame, a raking reel revolubly mounted on said reel frame, a drive shaft journaled on said supporting frame extending along the axis upon which said reel frame is pivotally mounted, means operatively connecting said drive shaft with said reel for rotating the reel, and means for swinging said reel frame vertically relative to said supporting frame for raising and lowering the reel without affecting the operation of the drive shaft for rotating the reel.

6. In a side delivery rotary rake, the combination of a supporting frame, a reel frame pivotally mounted on a diagonally-extending axis on said supporting frame, a raking reel revolubly mounted on said reel frame, a drive shaft journaled on said supporting frame extending along the axis upon which said reel frame is pivotally mounted, means operatively connecting each end of said reel with said drive shaft for rotation thereby, and means for swinging said reel frame vertically relative to said supporting frame for raising and lowering the reel without affecting the operation of the drive shaft for rotating the reel.

7. In a side delivery rake, the combination with a carrying frame comprising a front transverse wheel frame and a rearwardly extending wheel-supported frame, of a diagonally and rearwardly extending frame bar secured to said carrying frame, a reel frame pivotally mounted on said diagonally extending frame bar, a raking reel revolubly mounted on said reel frame, means carried by said frame bar and operatively connected with said wheel frame and the ends of said raking reel to revolve the latter, and means on said carrying frame and connected with the reel frame to rock the latter about its pivots to bodily move the revoluble reel about said frame bar as an axis.

8. In a side delivery rotary rake, the combination of a supporting frame, a U-shaped reel frame having one arm turned at an angle to the plane of the U, a diagonally-extending rod carried by said supporting frame and serving to pivotally connect the arms of said reel frame to said supporting frame with the cross-bar of the reel frame in substantially horizontal position, a raking reel revolubly mounted on said reel frame, means for driving said reel, and means for swinging said reel frame vertically relative to said supporting frame.

9. In a side delivery rotary rake, the combination of a supporting frame, a U-shaped reel frame having one arm turned at an angle to the plane of the U, means for pivotally connecting the ends of the arms of said reel frame to said supporting frame on an axis extending diagonally upward and to the rear with the angled arm of the reel frame connected at a higher point on said diagonally-extending axis than that at which the other arm of the reel frame is connected to said supporting frame, a raking reel revolubly mounted on said reel frame, means for driving said reel, and means for swinging said reel frame vertically relative to said supporting frame.

10. In a side delivery rotary rake, the combination of a supporting frame, a reel frame pivotally mounted on said supporting frame on an axis extending diagonally upward and to the rear, a raking reel revolubly mounted in horizontal position on said reel frame, means for rotating said reel, and means for swinging said reel frame vertically relative to said supporting frame.

11. In a side delivery rotary rake, the combination of a supporting frame, a reel frame pivotally mounted on said supporting frame on an axis extending diagonally upward and to the rear, a raking reel revolubly mounted in horizontal position on said reel frame, driving means revoluble about an axis co-incident with the axis upon which said reel frame is pivotally mounted, means for operatively connecting said driving means with said reel for rotating the reel, and means for swinging said reel frame vertically relative to said supporting frame.

12. In a side delivery rotary rake, the combination of a supporting frame, a reel frame pivotally mounted on said supporting frame on an axis extending diagonally upward and to the rear, a raking reel revolubly mounted in horizontal position on said reel frame, a drive shaft journaled on said supporting frame on the axis upon which said reel frame is pivotally mounted, means for operatively connecting said drive shaft with said reel for rotating the reel, and means for swinging said reel frame vertically relative to said supporting frame.

13. In a side delivery rotary rake, the combination of a supporting frame, a reel frame pivotally mounted on said supporting frame on an axis extending diagonally upward and to the rear, a raking reel revolubly mounted in horizontal position on said reel frame, a drive shaft journaled on said supporting frame on the axis upon which said reel frame is pivotally mounted, means for operatively connecting each end of said reel with said shaft for rotating the reel, and means for swinging said reel frame vertically relative to said supporting frame about said shaft.

14. In a side delivery rotary rake, the combination of a supporting frame comprising a rearwardly-extending arched frame bar, carrying wheels serving to support the forward end of said arched frame bar, a caster wheel mounted on the rear end of said arched frame bar, a reel frame pivotally mounted on a diagonally-extending axis on said supporting frame, a raking reel revolubly mounted on said reel frame, means for driving said reel, a bell-crank lever mounted on said arched frame bar, and diagonally-disposed links connected at their upper ends with said lever and at their lower ends with said reel frame in spaced relation to each other.

15. In a side delivery rotary rake, the combination of a supporting frame comprising a rearwardly-extending arched frame bar, a second frame bar extending diagonally-rearwardly, and a plurality of brace bars firmly connecting said two frame bars, a reel frame pivotally mounted on said supporting frame adapted to swing about said second frame bar, a raking reel revolubly mounted on said reel frame, means for driving said reel, a bell-crank lever mounted on said arched frame bar, and diagonally-disposed links connected at their upper ends with said lever and at their lower ends with said reel frame in spaced relation to each other.

16. In a side delivery rotary rake, the combination of a supporting frame comprising a rearwardly-extending arched frame bar, a second frame bar extending diagonally rearwardly and upwardly, and a plurality of brace bars firmly connecting said two frame bars, a reel frame pivotally mounted on said diagonally-extending frame bar, a raking reel revolubly mounted on said reel frame, means for driving said reel, and adjustable connecting means between said arched frame bar and said reel frame for swinging said reel vertically.

17. In a side delivery rotary rake, the combination of an axle, carrying wheels mounted on said axle for supporting and driving the same, a rearwardly-extending arched frame bar journaled at its forward end upon said axle, a caster wheel journaled on the rear end of said arched frame bar, a second frame bar journaled at its forward end upon said axle and extending diagonally upward and to the rear therefrom, a plurality of braces firmly connecting said two frame bars, a reel frame pivotally mounted on said diagonally-extending frame bar, a raking reel revolubly mounted on said reel frame, means for driving said reel, and adjustable connecting means between said arched frame bar and said reel frame for swinging said reel vertically.

18. In a side delivery rotary rake, the combination of a supporting frame, a diagonally-disposed raking reel revolubly mounted thereon, comprising two reel heads by which the reel is revolubly mounted, and two sets of means independent of each other for driving said two reel heads at the same speed of rotation.

19. In a side delivery rotary rake, the combination of a supporting frame, a diagonally-disposed raking reel revolubly mounted thereon, comprising two reel heads by which the reel is revolubly mounted and teeth supported between said two heads and revolving in vertical position therebetween, said teeth when in their uppermost position extending downward beyond the axis of rotation of the reel, means for driving one of said reel heads, and other means for driving the other reel head at the same speed of rotation.

20. In a side delivery rotary rake, the combination of a supporting frame, a diagonally-disposed raking reel revolubly mounted thereon, comprising two reel heads by which the reel is revolubly mounted, shafts extending between said two heads and supported thereby and revoluble about the axis of rotation of said heads, means for holding said shafts against turning as they revolve about the axis of the reel, and teeth carried by said shafts and held constantly in vertical position relative thereto, said teeth when in their uppermost positions extending downward beyond the axis of rotation of the reel, a shaft journaled on said supporting frame alongside of said reel, means for rotating said shaft, means connecting one of said reel heads with said shaft for rotating said head, and other means connecting the other reel head with said shaft for rotating said other head at the same speed.

21. In a side delivery rotary rake, the combination of a supporting frame, a diagonally-disposed raking reel revolubly mounted thereon, comprising two reel heads by which the reel is revolubly mounted, a shaft journaled on said supporting frame alongside of said reel, means for rotating said shaft, means connecting one of said reel heads with said shaft for rotating said head, and other means connecting the other reel head with said shaft for rotating said other head at the same speed.

JOSEPH DAIN.